United States Patent
Banerjee et al.

(10) Patent No.: US 9,582,379 B2
(45) Date of Patent: Feb. 28, 2017

(54) MULTI-SITE DISASTER RECOVERY MECHANISM FOR DISTRIBUTED CLOUD ORCHESTRATION SOFTWARE

(71) Applicant: International Business Machines Corporation, Armonk, NY (US)

(72) Inventors: Pradipta K. Banerjee, Bangalore (IN); Sudipta Biswas, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 192 days.

(21) Appl. No.: 14/305,157

(22) Filed: Jun. 16, 2014

(65) Prior Publication Data

US 2015/0363276 A1    Dec. 17, 2015

(51) Int. Cl.
*G06F 11/00*    (2006.01)
*G06F 11/20*    (2006.01)

(52) U.S. Cl.
CPC ........ *G06F 11/203* (2013.01); *G06F 11/2035* (2013.01); *G06F 11/2048* (2013.01)

(58) Field of Classification Search
CPC ............. G06F 11/1464; G06F 11/2028; G06F 11/203; G06F 11/2048
See application file for complete search history.

(56) References Cited

U.S. PATENT DOCUMENTS

| | | | | |
|---|---|---|---|---|
| 7,426,616 B2* | 9/2008 | Keeton | ............... | G06F 11/1469 711/161 |
| 7,600,148 B1* | 10/2009 | Shaw | ................... | G06F 11/2028 714/15 |
| 7,685,465 B1* | 3/2010 | Shaw | ................... | G06F 11/2028 709/239 |
| 7,747,898 B1* | 6/2010 | Shaw | ................... | G06F 11/2028 709/239 |
| 7,769,886 B2 | 8/2010 | Naseh et al. | | |
| 7,861,111 B2* | 12/2010 | Doerr | ................... | G06F 11/2035 714/2 |

(Continued)

OTHER PUBLICATIONS

Wood et al.; "Disaster Recovery as a Cloud Service: Economic Benefits & Deployment Challenges;" HotCloud'10 Proceedings of the 2nd USENIX conference on Hot topics in cloud computing; Jun. 22, 2010; pp. 1-7.*

(Continued)

*Primary Examiner* — Joseph Kudirka
(74) *Attorney, Agent, or Firm* — Gilbert Harmon, Jr.

(57) ABSTRACT

Multi-site disaster recovery mechanism performed by the following steps: (i) providing a disaster recovery (DR) system that includes a plurality of sites where each site of the plurality of sites actively serves infrastructure-as-a-service to a set of tenant(s); (ii) for each site of the plurality of sites, determining the following characteristics of the site: workloads that require DR, workloads characteristics, tenants and capabilities; (iii) for each site of the plurality of sites, determining a plurality of associated sites; and (iv) on condition that a disaster occurs which impacts a first site of the plurality of sites, distributing a primary site workload of the first site across the associated sites of the first site. The determination of the plurality of associated sites associated with each site is based upon at least one of the following characteristics: capacity, workloads that require DR, workloads characteristics, tenants and/or capabilities.

15 Claims, 4 Drawing Sheets

(56) References Cited

U.S. PATENT DOCUMENTS

| | | | |
|---|---|---|---|
| 7,945,537 B2 | 5/2011 | Balasubramanian et al. | |
| 8,074,107 B2* | 12/2011 | Sivasubramanian | G06F 11/2025 |
| | | | 714/11 |
| 8,707,254 B2* | 4/2014 | Oslake ................ | G06F 8/30 |
| | | | 717/106 |
| 9,436,560 B2* | 9/2016 | Gupta ................ | G06F 11/1461 |
| 2011/0270968 A1* | 11/2011 | Salsburg ............... | G06F 9/5072 |
| | | | 709/224 |
| 2013/0007503 A1* | 1/2013 | Anaya ................ | G06F 11/2035 |
| | | | 714/4.1 |
| 2013/0318221 A1 | 11/2013 | Anaya et al. | |

OTHER PUBLICATIONS

"CloudArray Compute Anywhere" Twin Strata, provided by inventor in post disclosure comments dated Dec. 5, 2013, <http://www.twinstrata.com/cloudarray-compute-anywhere/>.

* cited by examiner

MULTI-SITE DISASTER RECOVERY MECHANISM FOR DISTRIBUTED CLOUD ORCHESTRATION SOFTWARE

BACKGROUND OF THE INVENTION

The present invention relates generally to the field of data storage, and more particularly to disaster recovery.

Disaster recovery (DR) is the process, policy, and/or procedures that are related to preparing for recovery, or the continuation, of a technology infrastructure. Disaster recovery is vital to an organization after a natural or human induced IT (information technology) disaster. Disaster recovery focuses on the IT systems that support some or all functions of a company or business. IT disaster recovery control measures can be classified into one of the following three (3) types: preventive, detective, and/or corrective. Normally, disaster recovery plans document these three (3) types of control measures and are exercised regularly by companies and businesses using disaster recovery tests or drills. Some of the most common strategies for disaster recovery and data protection include: (i) backups made on magnetic tape and sent off-site; (ii) backups made to hard disk on-site and automatically copied to off-site hard disk; (iii) backups made directly to off-site hard disk; (iv) replication of data to an off-site location which overcomes the need to restore the data; (v) hybrid cloud solutions that replicate to on-site and also to off-site data centers; (vi) and/or (vii) the use of systems that are highly available, where both the data and system are replicated off-site. Sometimes a business will use an outsourced disaster recovery provider that utilizes cloud computing/storage, rather than using their own remote facilities.

Active-Passive DR software controls datacenters/sites which operate with a backup infrastructure other than the production site. The backup site is not in use unless a disaster forces the Active site workloads to move to the backup site. Similarly an Active-Active DR software considers that two, or more, sites participate in Disaster Recovery with both the sites running production workloads. Each site shares a reserved infrastructure that can be used to accommodate other active site data in case of a disaster.

Infrastructure as a service (IaaS) is a known way of doing business over a communication network. Providers of IaaS offer typically computers, such as physical machines, virtual machines, and/or other resources. For example, a hypervisor of the IaaS provider may run the virtual machines as guests. Pools of hypervisors within the cloud operational support-system can support large numbers of virtual machines and the ability to scale services up and down according to a customer's requirements, which will generally vary over time. Some IaaS providers offer additional resources such as the following: a virtual-machine disk image library, raw (block) and file-based storage, firewalls, load balancers, IP addresses, virtual local area networks (VLANs), and/or software bundles. Some IaaS providers provide these resources on-demand from their large pools of hardware resources. Customers can use either the Internet or carrier clouds (dedicated virtual private networks) for wide area coverage. IaaS providers typically bill IaaS services on a utility computing basis so that cost reflects the amount of resources allocated and consumed.

SUMMARY

According to an aspect of the present invention, there is a method, computer program product and/or system that performs the following steps (not necessarily in the following order): (i) providing a disaster recovery (DR) system that includes a plurality of sites where each site of the plurality of sites actively serves infrastructure-as-a-service to a set of tenant(s); (ii) for each site of the plurality of sites, determining the following characteristics of the site: workloads that require DR, workloads characteristics, tenants and capabilities; (iii) for each site of the plurality of sites, determining a plurality of associated sites; and (iv) on condition that a disaster occurs which impacts a first site of the plurality of sites, distributing a primary site workload of the first site across the associated sites of the first site. The determination of the plurality of associated sites associated with each site is based upon at least one of the following characteristics: capacity, workloads that require DR, workloads characteristics, tenants and/or capabilities.

DETAILED DESCRIPTION

Figure 1:
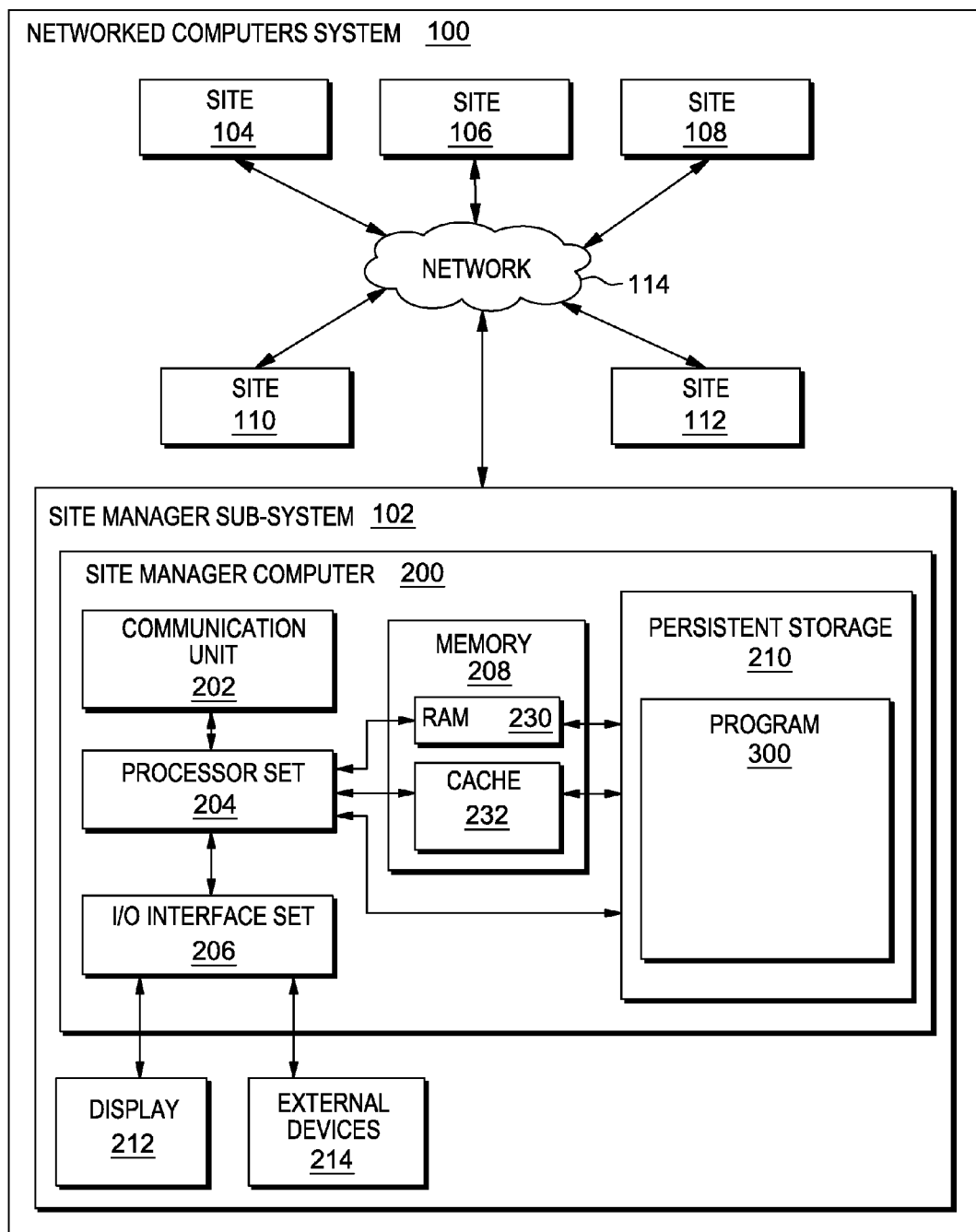
FIG. 1 is a schematic view of a first embodiment of a system according to the present invention.

IaaS disaster recovery where sites in a set of "associated sites" provide backup for each others workloads in the event of a disaster. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: site manager sub-system 102; DR site sub-systems 104, 106, 108, 110, 112; communication network 114; site manager computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
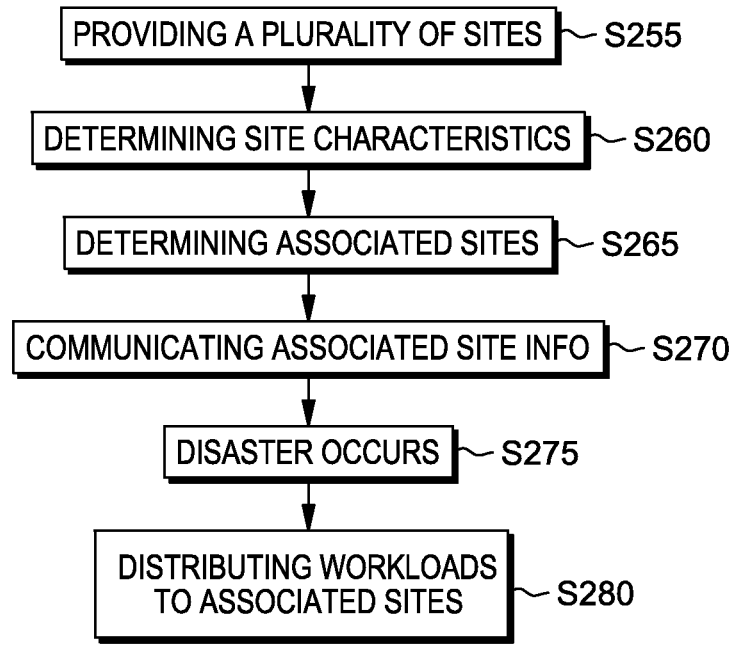
FIG. 2 is a flowchart showing a first embodiment of a method according to the present invention.
Figure 3:
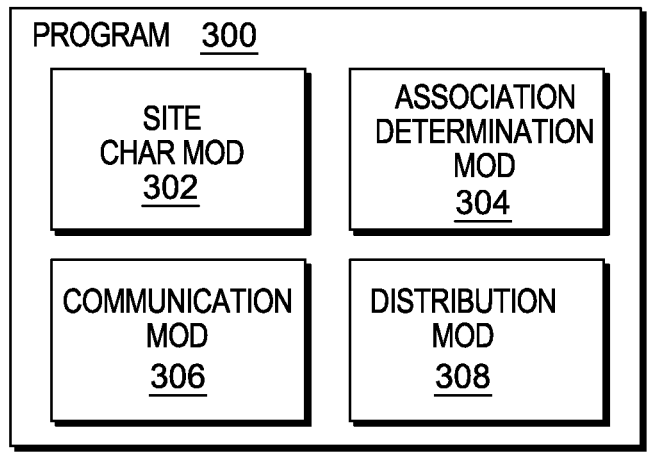
FIG. 3 is a schematic view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where site characteristics module ("mod") 302 receives a list of DR sites 104, 106, 108, 110, 112 (see FIG. 1), which are all of the disaster recovery sites in DR system 100. As will be discussed in connection with the rest of the steps of flow chart 250, site manager sub-system 102 (and its program 300) manage the DR sites of the DR system.

Processing proceeds to step S260, where mod 302 determines relevant characteristics of each DR site 102, 104, 106, 108, 110, 112. In this particular embodiment, the site characteristics determined at step S260 are as follows: capacity, workloads that require DR, workloads characteristics, tenants and capabilities. The geographical location of the site is not a program input in this embodiment because this site is assumed to be collocated to one geography.

Processing proceeds to step S265, where association determination mod 304 determines certain sites to be mutually associated based, at least in part, on the site characteristics determined at step S260. In this particular example, association determination mod 304 determines two (2) sets of associated sites as follows: (i) sites 104, 106 and 108; and (ii) sites 110 and 112. Below, the Further Comments And/Or Embodiments(s) sub-section of this Detailed Description section will further discuss the manner in which site characteristics can be used to determine associated groups of sites. The associated sites within a group are used to back each other up in the event of a disaster.

Processing proceeds to step S270, where the site associations are communicated, from communication mod 306 and through network 114 (see FIG. 1) across all of the site locations. In this way, each site will have an identification of its associated sites so that a site can receive assistance from associated sites in the event of disaster.

Processing proceeds to step S275, where a natural disaster occurs which impacts site 104 (see FIG. 1).

Processing proceeds to step S280, where distribution mod 308 distributes workloads, that would normally be performed by site 104, to site 104's associated sites 106 and 108. When a disaster occurs, this embodiment distributes the workload on to the associated sites. Alternatively, site management sub-system 102, and its program 300, may not be involved in re-distribution of workloads made in response to a disaster.

III. Further Comments and/or Embodiments

Some embodiments of the present invention may recognize one, or more, of the following potential problems, drawbacks or opportunities for improvement with respect to the state of the art: (i) some software methods that aim to provide an active-passive disaster recovery mechanism for IaaS cloud orchestration software only provide active-passive DR (disaster recovery) and not active-active, resulting in very costly DR solutions; (ii) some software methods that aim to provide an active-passive disaster recovery mechanism for IaaS cloud orchestration software don't handle SLAs (service-level agreements) for cloud applications; (iii) some software methods that aim to provide an active-passive disaster recovery mechanism for IaaS cloud orchestration software are slow, resulting in increased RTO (recovery time objective); (iv) conventional disaster recovery mechanisms spanning active-passive or active-active combinations are fine tuned for a single application; (v) conventional disaster recovery mechanisms spanning active-passive or active-active combinations are not suitable for distributed Infrastructure as a Service (IaaS) cloud orchestration software like those available with openstack, cloudstack, etc.; and/or (vi) orchestration software of the type mentioned in the previous two (2) items on this list typically consist of multiple individual applications working together to provide the IaaS functionality.

Some embodiments of the present invention may include one, or more, of the following features, characteristics and/or advantages: (i) a mechanism to provide for disaster recovery for a distributed Infrastructure as a Service (IaaS) cloud orchestration software; (ii) use multiple backup sites to split the workload for a given primary site, ensuring the given site performs both the roles of primary and backup at the same time; (iii) no dedicated secondary backup sites for a given primary site; (iv) every site is active at any given point of time serving IaaS to it's tenants; (v) each active primary site is paired up with certain other active sites (N-Backup) that act as respective secondary sites; (vi) the primary site workloads are distributed across multiple secondary sites; (vii) site characteristics metadata are used to create pairing, noting that pairing can be static and created a priori or dynamic); (viii) further site metadata, along with information on paired sites, are made available across all the sites; and/or (ix) further site metadata, along with information on paired sites, are leveraged for automated disaster recovery via an external DR orchestrator or manual disaster recovery process.

Further with regard to item (vii) in the paragraph above, site characteristics metadata may include but are not limited to: capacity, workloads requiring DR, workload characteristics, and/or tenants.

Capacity refers to the available resources (for example, cpu (central processing unit resource), memory, bandwidth, etc.) that a particular site can share with the workloads. If the site is considered as a container—it might be allowed to fill 70% of the container and leave the rest for sharing with another container—if the other container needs to migrate it's workload to this site in case of a disaster.

"Workloads requiring DR" will now be briefly discussed. The user of the cloud might not want all the workloads to be protected. For this reason, in this embodiment, "workloads requiring DR" is an optional parameter left to the users discretion. "Workloads requiring DR" are the ones which form the filtered list of workloads that have been selected by the user that are required to be protected.

"Workload characteristics," as the term is used herein, refer to a number of things including the workload memory/cpu demands and a behavioral pattern that describes a model related to the usage of memory/cpu over time.

Certain characteristics of the tenants affect how backup site pairing is determined. In this embodiment, it is known that a tenant usually prefers that all of it's workloads are collocated on a certain site due to various reasons including better performance, security policies, etc. It is easier to distribute workloads on a per tenant basis which would mean that the tenant data is collocated on a given site only. For this reason, at the time of disaster, the distribution of workload is based on the tenant, although this is not a hard bound parameter.

Some embodiments of the present invention may further include one, or more, of the following features, characteristics and/or advantages: (i) method to determine the appropriate backup sites for a primary site based on site characteristics including capability, capacity, workload characteristics, tenants etc.; (ii) method for disaster recovery of workloads running in the failed site across multiple secondary active sites; (iii) method to determine the order of recovery of workloads across multiple secondary sites based on SLO (service level objective) and to improve RTO in case of a disaster; and/or (iv) method to fine tune disaster recovery by tagging workloads based on their usage for resource optimization during recovery.

Figure 4:
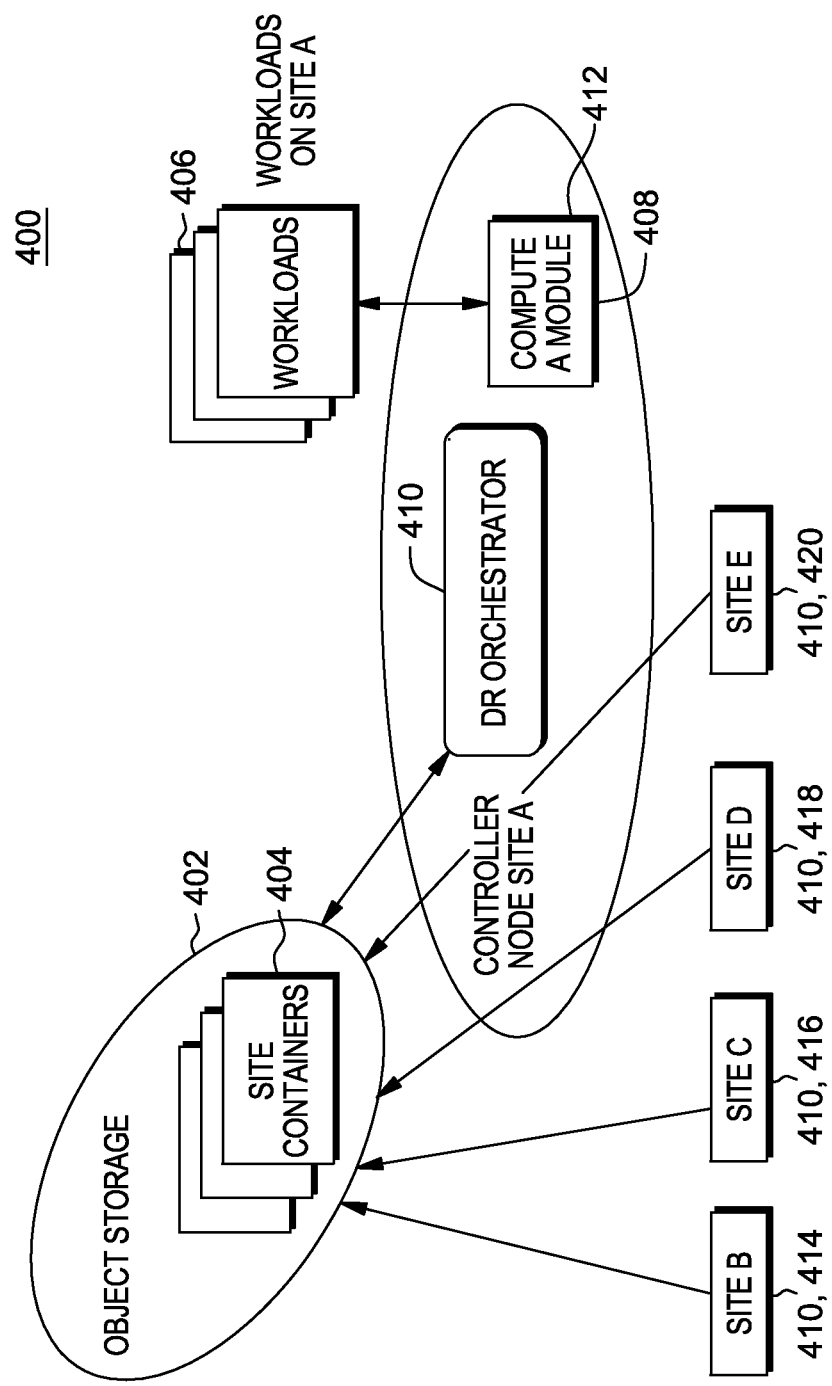
FIG. 4 is a schematic view of a second embodiment of a system according to the present invention.

As shown in FIG. 4, schematic view 400, some embodiments of the current invention use distributed cloud orchestration software, such as openstack, illustrating various portions of object storage 402, which contains site containers 404; workloads 406; controller node site A 408, which contains DR orchestrator 410 and compute A module 412; secondary site B 414; secondary site C 416; secondary site D 418; and secondary E 420.

In the following paragraph, the characteristics of a multi-site deployment model will be discussed.

Some embodiments of the present invention further recognize that every site has metadata providing the site characteristics. This metadata is used to determine the mapping of workloads 406 to secondary sites (site B 414, site C 416, site D 418, site E 420) where the secondary sites publish available resources to the DR orchestrator 410. Following are some of the contents of the site metadata, noting there can be many more based on requirements: (i) SiteName; (ii) SiteComputeCapacity; (iii) SiteStorageCapacity; (iv) SiteTenantsList; (v) SiteWorkloadsRequiringDRList; (vi) SiteSpareQuotaforDR; and/or (vii) SiteUniqueFeaturesList. This metadata is stored in shared replicated object storage 402, against a common account specific for DR, and against specific site containers 404.

Furthermore, the characteristics of a DR orchestrator service and master election will be discussed in the following paragraph.

Some embodiments of the present invention further recognize that the DR orchestrator 410 is a component that runs as a daemon on every site and is responsible for carrying out disaster recovery processes when a given site becomes inoperative. A copy of the DR orchestrator 410 service runs on every site, usually on the controller node 408 itself. However at any given point of time, only one of the DR orchestrators is the master. For a specific site at the time of a disaster, the DR orchestrator 410 may also become inoperative. If it happens to be the master, a new master selection among the copy of the DR services running on other sites is elected. The master selection is done in a multi-cluster environment. After the master is selected, the orchestrator component reads the metadata information from the object storage 402 for the site that became inoperative (went down) and performs the steps required for DR.

Furthermore, the characteristics of selecting a back-up/secondary site for a given primary site will be discussed in the following paragraph.

Some embodiments of the present invention further recognize that a very simple mechanism for selecting backup sites for a primary site is by splitting the tenant space of the primary site. For example, primary site A 412 with tenants TA1, TA2, TA3 (not shown), will be using site B 414 for tenant TA1 and TA2 and site C 416 for tenant TA3.

More complex and optimal mechanisms can be used for selecting the backup sites. Examples include but are not limited to: (i) splitting the tenants based on a combination of the tenant's workload characteristics like SLA/SLO etc.; (ii) splitting the tenants based on site characteristics like capacity; (iii) splitting the tenants based on unique features; (iv) selecting the secondary sites based on the workload characteristics only, without any consideration of the associated tenant; (v) selecting more than one secondary site for a given tenant or workload; and/or (vi) assigning a priority to the secondary site(s) if required. Note that the above points are just examples and illustrated for the purpose of clarification. There could be multiple variations of the above points.

Furthermore, the characteristics of relationship objects between primary and secondary sites have two steps which will be discussed in the following two paragraphs.

The first relationship between a primary site and backup site(s) is stored in the shared object storage 402 if site pairing is done by splitting primary site tenant space, then PrimarySiteKey:{BackupSiteKey1:primary_tenant_list, backup_site_priority}, {BackupSiteKey2:primary_tenant_list, backup_site_priority}. Continuing the above example where a primary site A 412 with tenants TA1, TA2, TA3, will be using site B 414 for tenant TA1 and TA2 and site C 416 for tenant TA3, the relationship will look like: SiteAKey:{SiteBKey:[TA1, TA2], Prio3}, {SiteCKey:[TA3], Prio10}.

The second relationship between a primary site and backup site(s) is stored in the shared object storage 402 if site pairing is done by splitting the primary site workload, then PrimarySiteKey:{BackupSiteKey1:Workload1Key, Workload2Key, backup_site_priority}, {BackupSiteKey2: Workload3Key, Workload4Key, backup_site_priority}.

Furthermore, the details on workloads requiring DR will be discussed in the following three (3) paragraphs.

Some embodiments of the present invention further recognize that certain information will be required for the site specific workloads requiring DR and the same needs to be available in the secondary sites for recovery. This is again stored in the shared object storage 402 and the details are as follows: {WorkloadKey: Workload-Metadata, PrimarySiteKey, BackupSiteKey1, BackupSiteKey2 ... }. The WorkloadKey can be a combination of PrimarySiteKey Tenant and Workload identifier etc., which helps to uniquely identify the workload among all the sites. The BackupSiteKey identifies the backup/secondary site for the primary site and is deduced automatically from the pairing information deduced earlier. For example, if using a tenant as the means to decide secondary site(s), then based on the specific tenant associated with the workload, the BackupSiteKey is deduced. Extending the above example of primary site A 412 with tenant TA1, TA2, TA3, (using site B 414 for tenant TA1 and TA2 and site C 416 for tenant TA3), if the workload in site A 412 is associated with TA3, then BackupSiteKey is site C 416.

Some embodiments of the present invention further recognize that the workload metadata contains all the metadata information required to recover the workload on the BackupSiteKey (note that it doesn't contain the actual workload data). All the above data is made available as part of site specific metadata as part of SiteWorkloadsRequiringDRList.

Some embodiments of the present invention further recognize that for workloads requiring DR, the following needs to be ensured during workload provisioning to ensure workload data is available on the secondary site(s) for recovery: (i) if leveraging distributed object storage, there should be a provision to store workload data continuously; (ii) existing mechanisms like snapshots etc., can be used to store data continuously in the distributed object storage; or (iii) if storage mirroring (like those available in external SAN storages) is used, then information on the source target pair for the associated storage should be made available in the workload metadata so that the recovery process can retrieve the data.

In the following paragraph, the details on the shared replicated object storage usage will be discussed.

Some embodiments of the present invention further recognize that a common account for DR is created on the object storage which is used by the DR orchestrators. Containers are created within this account for each of the sites as follows: (i) http://objectstore.example.com/v1/account/container_siteA/site_char (where "site_char" defines the characteristics of the site described using the site metadata); (ii) http://objectstore.example.com/v1/account/container_siteA/object_resources (where "object_resources" is a list of objects with each object containing the workload metadata). Note that there can be multiple variants to this way of storing information.

Furthermore, the characteristics of the recovery steps will be discussed in the following paragraph.

Some embodiments of the present invention further recognize that there could be multiple ways to recover from IT (information technology) data disaster. The recovery can be based on the failed workloads requiring DR. Alternatively, the recovery can be based on the recovery priority for a specific secondary site, or the recovery process can be initiated in a parallel fashion on multiple secondary sites. At a high level, the workload based recovery process will include but is not limited to the following: (i) obtaining the list of workloads eligible for DR from the sites metadata for the failed site; (ii) finding the backup site from the workload metadata for each workload; (iii) selecting the backup site with the highest priority of all the backup sites found; and/or (iv) recreating the workload on the backup site (for all the workloads mapped to the specific backup site) using the workload metadata where resources, storage mapping, etc. are required. Note that the secondary site priority, for a given primary site, can be statically defined by the administrator, or can be deduced automatically.

Figure 5:
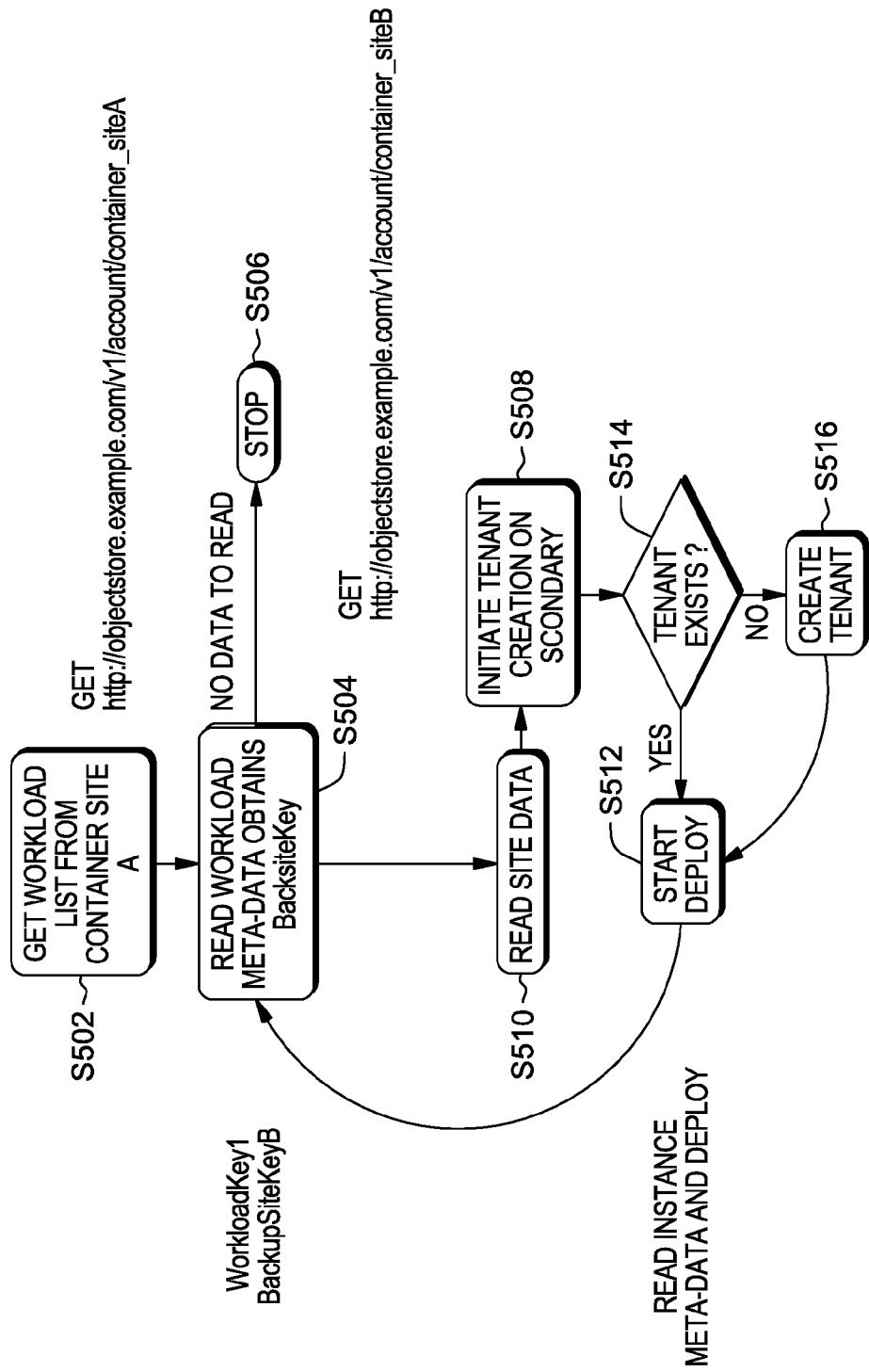
FIG. 5 is a flowchart showing a second embodiment of a method according to the present invention.

The recovery process described above will now be discussed in more detail with reference to the flowchart 500 shown in FIG. 5. Workload based disaster recovery on Site A begins at step S502, where a GET command obtains the workload list from container Site A (http://objectstore.example.com/v1/account/container_siteA). Processing continues to step S504 where reading of the workload metadata obtains the BacksiteKey. If there is no data to read, processing continues to step S506, where the processing stops. If there is data to read, processing continues to step S510 where the site data is read. Processing continues to step S508 where tenant creation on the secondary site is initiated. Processing continues to step S514 where the software determines if the tenant already exists. If the software determines that the tenant does not exist (No) processing continues to step S516 where the tenant is created by the software and processing continues to step S512. If the software determines in step S514 that the software does exist (Yes), processing continues to step S512 where reading instance metadata and deployment starts. Processing continues where the software returns to step S504 where the software obtains WorkloadKey1 BackupSiteKeyB and a GET command obtains the workload list from container Site B (http://objectstore.example.com/v1/account/container_siteB).

Some embodiments of the present invention further recognize that one of the ways to determine the site priority dynamically is as follows: (i) the primary site workload priority be defined as Pi. Pi is a function of SLA norms associated with a given workload; (ii) the number of primary site workloads that are mapped to the secondary site is denoted by Q; and/or (iii) the total number of workloads requiring DR on the primary site is denoted by N. The mean workload priority M for a secondary site=(P1+P2+P3 . . . PN)/Q. Share per site S=Q/N. The priority of a given secondary site PS=M*S. The higher the value of PS, the higher the priority of a given secondary site. Consequently, order of the recovery process will be as per the PS value.

Furthermore, the characteristics of recovery optimization through workload heuristics will be discussed in the following paragraph.

Some embodiments of the present invention further recognize that the secondary site(s) share the burden of the primary site(s) in case of an IT data disaster. Hence it becomes important to ensure that the workloads are performance tuned. The workloads are measured with respect to the resources assigned verses actually consumed. Heuristics is used to arrive at a mean usage parameter for each of the resource values on the primary site and the same is available as part of the workload metadata. This information can be leveraged by the provisioning scheduler in the secondary site during recovery for better resource usage and workload packing.

Some embodiments of the present invention may further include one, or more, of the following features, characteristics and/or advantages: (i) an apparatus for carrying out workload DRs, including a unique way of distributing them, by partnering with other sites willing to participate in a joint DR; (ii) replicate workloads on multiple secondary sites like the way it was on the primary site, thus reducing the need of dedicated hardware in the datacenter performing DR; and/or (iii) as a product for object storage.

Some embodiments of the present invention may further include one, or more, of the following features, characteristics and/or advantages: (i) load balancing is not needed, since the workloads are replicated only when the disaster actually takes place; (ii) replicating workloads are considered, but only during disaster recovery; (iii) operates with minimal data for mapping of a given workloads backup site; (iv) the workload is not created until disaster recovery is needed; (v) creates a network of active sites which can be used to host workloads at the time of disaster recovery; and/or (vi) deals with multiple replicas of an application run on various data centers.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

The invention claimed is:

1. A method comprising:
providing a disaster recovery (DR) system that includes a plurality of sites where each site of the plurality of sites actively serves infrastructure-as-a-service to a set of tenant(s), and all workloads associated with each tenant, respectively, are collocated on a single site;
for each site of the plurality of sites, determining characteristics of the site: workloads that require DR, workload characteristics, tenants, and capabilities;
for each site of the plurality of sites, determining a plurality of associated sites and sharing site metadata and site pairing information with the plurality of associated sites for at least one of automated disaster recovery via an external DR orchestrator and a manual disaster recovery process; and
on a condition that a disaster occurs which impacts a first site of the plurality of sites, distributing a primary site workload of the first site across the associated sites of the first site;
wherein:
the determination of the plurality of associated sites associated with each site is based upon at least one of: capacity, workloads that require DR, workload characteristics, tenants, and capabilities.

2. The method of claim 1 wherein:
the determination of the plurality of associated sites associated with each site occurs intermittently during normal operations of the DR system.

3. The method of claim 1 further comprising:
determining an order of recovery of workloads across multiple secondary sites based on a service level objective.

4. The method of claim 1 further comprising:
determining an order of recovery of workloads across multiple secondary sites to improve a recovery time objective in case of a disaster.

5. The method of claim 1 further comprising:
fine tuning disaster recovery by tagging workloads based on their usage for resource optimization during recovery.

6. A computer program product comprising a computer readable storage medium having stored thereon:
first program instructions programmed to provide a disaster recovery (DR) system that includes a plurality of sites where each site of the plurality of sites actively serves infrastructure-as-a-service to a set of tenant(s), and all workloads associated with each tenant, respectively, are collocated on a single site;
second program instructions programmed to for each site of the plurality of sites, determine characteristics of the site: workloads that require DR, workload characteristics, tenants, and capabilities;
third program instructions programmed to for each site of the plurality of sites, determine a plurality of associated sites and sharing site metadata and site pairing information with the plurality of associated sites for at least one of automated disaster recovery via an external DR orchestrator and a manual disaster recovery process; and
fourth program instructions programmed to on a condition that a disaster occurs which impacts a first site of the plurality of sites, distribute a primary site workload of the first site across the associated sites of the first site;
wherein:
the determination of the plurality of associated sites associated with each site is based upon at least one of: capacity, workloads that require DR, workload characteristics, tenants, and capabilities.

7. The product of claim 6 wherein:
the determination of the plurality of associated sites associated with each site occurs intermittently during normal operations of the DR system.

8. The product of claim 6 wherein the medium has further stored thereon:
fifth program instructions programmed to determine an order of recovery of workloads across multiple secondary sites based on a service level objective.

9. The product of claim 6 wherein the medium has further stored thereon:
fifth program instructions programmed to determine an order of recovery of workloads across multiple secondary sites to improve a recovery time objective in case of a disaster.

10. The product of claim 6 wherein the medium has further stored thereon:
fifth program instructions programmed to fine tune disaster recovery by tagging workloads based on their usage for resource optimization during recovery.

11. A computer system comprising:
a processor(s) set; and
a computer readable storage medium;
wherein:
the processor set is structured, located, connected and/or programmed to run program instructions stored on the computer readable storage medium; and
the program instructions include:
first program instructions programmed to provide a disaster recovery (DR) system that includes a plurality of sites where each site of the plurality of sites actively serves infrastructure-as-a-service to a set of tenant(s) and all workloads associated with each tenant, respectively, are collocated on a single site,
second program instructions programmed to for each site of the plurality of sites, determine characteristics of the site: workloads that require DR, workload characteristics, tenants, and capabilities,
third program instructions programmed to for each site of the plurality of sites, determine a plurality of associated sites and sharing site metadata and site pairing information with the plurality of associated sites for at least one of automated disaster recovery via an external DR orchestrator and a manual disaster recovery process, and
fourth program instructions programmed to on a condition that a disaster occurs which impacts a first site of the plurality of sites, distribute a primary site workload of the first site across the associated sites of the first site;
wherein:
the determination of the plurality of associated sites associated with each site is based upon at least one of: capacity, workloads that require DR, workload characteristics, tenants, and capabilities.

12. The system of claim 11 wherein:
the determination of the plurality of associated sites associated with each site occurs intermittently during normal operations of the DR system.

13. The system of claim 11 wherein the medium has further stored thereon:
fifth program instructions programmed to determine an order of recovery of workloads across multiple secondary sites based on a service level objective.

14. The system of claim 11 wherein the medium has further stored thereon:
fifth program instructions programmed to determine an order of recovery of workloads across multiple secondary sites to improve a recovery time objective in case of a disaster.

15. The system of claim 11 wherein the medium has further stored thereon:
fifth program instructions programmed to fine tune disaster recovery by tagging workloads based on their usage for resource optimization during recovery.

* * * * *